United States Patent [19]
Ueno

[11] Patent Number: 4,868,685
[45] Date of Patent: Sep. 19, 1989

[54] SIGNAL PREPROCESSING CIRCUIT OF A LINE SENSOR

[75] Inventor: Takeshi Ueno, Takarazuka, Japan

[73] Assignee: Ricoh Company, Ltd., Tokyo, Japan

[21] Appl. No.: 199,943

[22] Filed: May 27, 1988

[30] Foreign Application Priority Data

May 30, 1987 [JP] Japan .................................. 62-136946

[51] Int. Cl.⁴ .............................................. H04N 1/40
[52] U.S. Cl. ....,............................... 358/461; 358/471
[58] Field of Search ............... 358/280, 282, 284, 294, 358/293, 213.22, 213.19; 382/50, 52, 53; 250/578

[56] References Cited

U.S. PATENT DOCUMENTS

| | | | |
|---|---|---|---|
| 4,741,046 | 4/1988 | Matsunawa et al. ................. | 358/282 |
| 4,760,464 | 7/1988 | Sakano ................................... | 382/52 |
| 4,772,958 | 9/1988 | Suzuki ................................... | 358/294 |
| 4,812,667 | 3/1989 | Kobayashi et al. .................. | 250/578 |

Primary Examiner—Edward L. Coles, Sr.
Attorney, Agent, or Firm—Cooper & Dunham

[57] ABSTRACT

A preprocessing circuit of a line sensor which includes a plurality of photoelectric elements arranged in the form of a single array and divided into a plurality of blocks is provided. The preprocessing circuit includes a differential input/differential output preamplifier having a pair of input terminals and a pair of output terminals. A pair of read output data is collected by the preamplifier from a pair of photoelectric elements which are located substantially symmetrically with respect to the center of the line sensor while the line sensor is being scanned electronically. A pair of outputs from the preamplifier is selected such that there remain an output signal of a predetermined polarity. And, a peak value of the output of a predetermined polarity is sampled and held and it is adjusted in accordance with a dark level correction data stored in a memory for each of the photoelectric elements. The memory also stores a gain correction data for each of the photoelectric elements, which is used for correcting the gain of the output signal. Then, the output signal is converted into a digital signal.

7 Claims, 8 Drawing Sheets

SIGNAL PREPROCESSING CIRCUIT OF A LINE SENSOR

BACKGROUND OF THE INVENTION

1. Field of the Invention

This invention generally relates to a signal processing circuit of a one-dimensional image sensor and in particular to a signal preprocessing circuit of a line sensor for use in a facsimile machine or the like.

2. Description of the Prior Art

As an image sensor for use in a facsimile or the like, use has been made of a contact-type line sensor comprised of CCD or MOSFET elements and brought into contact with an original for optical reading thereof. An image signal obtained by electronically scanning such a contact-type line sensor is different in nature from that obtained by mechanical scanning using a single sensor. In particular, in the case of a contact-type line sensor, low frequency distortions tend to be introduced. This is because it is difficult to apply irradiation along the entire line uniformly and also it is difficult to manufacture a line sensor having a plurality of photoelectric elements all uniform in characteristic and thus same in sensitivity. Such distortions may originate from various factors, such as shading, non-uniformity in characteristic among photoelectric elements, a reduction of MTF (Modulation Transfer Function) and fluctuations of a peak value.

These distortions could have adverse effects on outputting image information of an original in the form of a binary value signal or a multi-value signal. Thus, it is required to provide a preprocessing circuit for correcting such distortions to thereby improve the stability and accuracy of an image signal obtained by optically reading an original. In addition, in the case of applications to facsimile machines, in order to optically read the information written on originals having different background levels, it is necessary to vary the dynamic range of a preprocessing circuit following the variation of a peak value which represents the maximum value (white) of the background level of an original.

Figure 2:
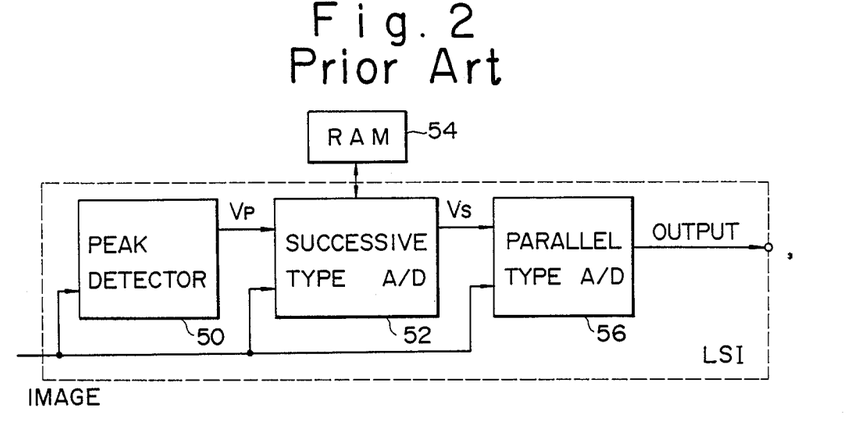
FIG. 2 is a block diagram showing a prior art preprocessing circuit.
Figure 3:
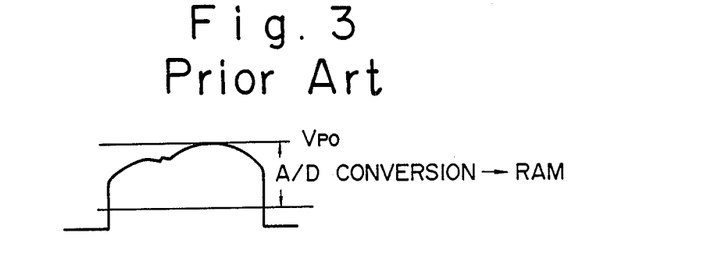
FIGS. 3 and 4 are waveform diagrams which are useful for understanding the operation of the circuit shown in FIG. 2.
Figure 4:
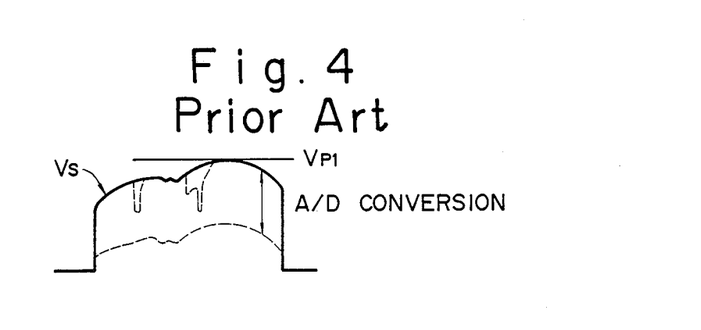

Typical prior art preprocessing circuits of a line sensor are shown in FIGS. 2 and 5. In a preprocessing circuit shown in FIG. 2, when a shading waveform is input into a peak detecting circuit 50, a peak value $V_{p0}$ is detected as shown in FIG. 3, which is then input into the reference input terminal of a successive A/D converter 52. At the successive A/D converter 52, the shading waveform is converted into a digital signal which is then stored in a RAM 54. Then, when an image signal is input next, its peak value $V_{p1}$ is similarly detected, which is then input into the reference input terminal of the successive A/D converter 52. At the same time, the contents of the RAM 52 are read out and the successive A/D converter 52 is operated as a D/A converter to thereby reproduce an analog shading signal $V_s$ as shown in FIG. 4. By utilizing a dividing function provided between the reference and input voltage inputs of the successive A/D converter 52, the thus reproduced shading signal $V_s$ is proportional to the peak value $V_{p1}$. With $V_s$ input as the reference voltage of a parallel A/D converter 56, the image signal is subjected to A/D conversion. In this manner, there is provided a preprocessing circuit which can follow the fluctuations of shading and peak value.

The preprocessing circuit shown in FIG. 2 is typically constructed in the form of LSI. However, it is to be noted that the preprocessing circuit shown in FIG. 2 requires the provision of two A/D converters, which is disadvantageous.

Figure 5:
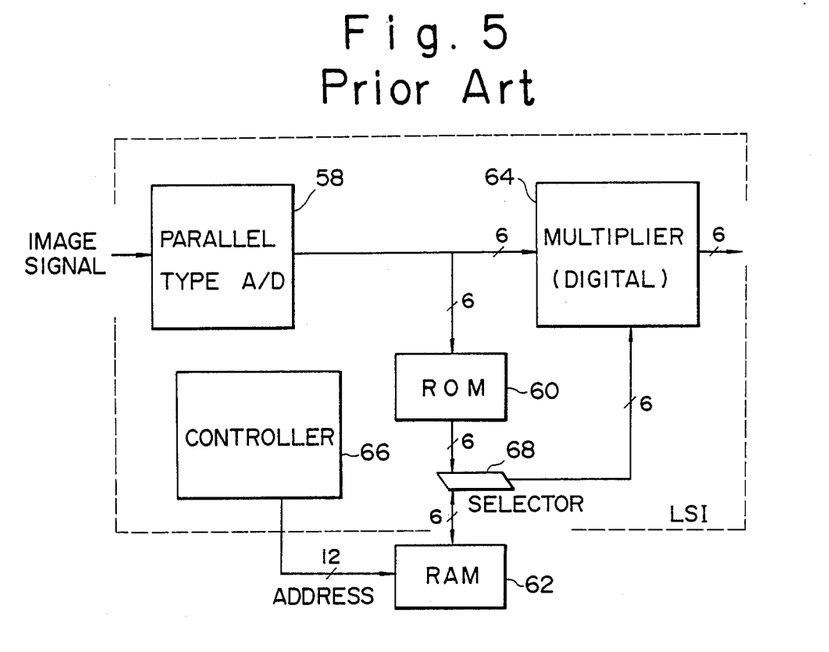
FIG. 5 is a block diagram showing another prior art preprocessing circuit.

FIG. 5 illustrates another prior art preprocessing circuit which is also typically constructed in the form of LSI. In this preprocessing circuit, shading is digitized by a parallel A/D converter 58 and the data converted by a ROM 60 is stored in a RAM 62. Then, when an image signal has been input, in synchronism with the process of converting it into digital data by the parallel A/D converter 58, the contents of the RAM 62 are read out and thus a corrected 6-bit digital image signal is output from a digital multiplier 64. This preprocessing circuit also includes a controller 66 and a selector 68. It is to be noted, however, that the preprocessing circuit shown in FIG. 5 requires the provision of the digital multiplier 64 and the ROM 60, which is also disadvantageous.

SUMMARY OF THE INVENTION

In accordance with the principle of the present invention, there is provided a preprocessing circuit of a line sensor which includes a preamplifier having a pair of input terminals which are operatively coupled to said line sensor to receive the outputs of a pair of sensor elements therefrom. The preamplifier also has a pair of output terminals so that the preamplifier receives a differential input from the line sensor and outputs a differential output. In the preferred embodiment, the preamplifier receives the outputs of a pair of sensor elements from the line sensor which are at locations which are substantially symmetrical with respect to the center of the line sensor.

A polarity converting circuit follows the preamplifier circuit and the polarity converting circuit converts the differential output from the preamplifier such that the polarity of the differential output remains to be a predetermined polarity. And, in the preferred embodiment, the polarity is maintained to be positive at all times. Thus, the polarity converting circuit selects either one of the pair of outputs from the preamplifier and passes the one having a predetermined polarity. A peak holding circuit follows the polarity converting circuit to hold the peak value of the signal output from the polarity converting circuit.

In the preferred embodiment, a dark level correcting circuit is provided to correct the dark level of the peak value detected by the peak hold circuit in accordance with information of individual photoelectric elements of the line sensor, which information may be preferably stored in a memory. In addition, a variable gain amplifier circuit is also provided for correcting the gain of a detected signal in accordance with the information regarding the individual photoelectric elements of the line sensor, which information is also preferably stored in the memory. Also preferably provided is a background level detecting circuit which includes a peak holding circuit which in turn holds the peak value when a background has been detected. Besides, there is preferably provided an A/D converter which carries out analog-to-digital conversion of a detected signal using the background level as a reference level.

It is therefore a primary object of the present invention to obviate the disadvantages of the prior art as described above and to provide an improved preprocessing circuit of a line sensor.

Another object of the present invention is to provide an improved preprocessing circuit of a line sensor for use in a facsimile or the like which is stable, accurate and reliable in operation.

A further object of the present invention is to provide an improved preprocessing circuit of a line sensor having a high S/N ratio.

A still further object of the present invention is to provide an improved preprocessing circuit having a shading correction function.

Other objects, advantages and novel features of the present invention will become apparent from the following detailed description of the invention when considered in conjunction with the accompanying drawings.

DESCRIPTION OF THE PREFERRED EMBODIMENTS

Figure 1:
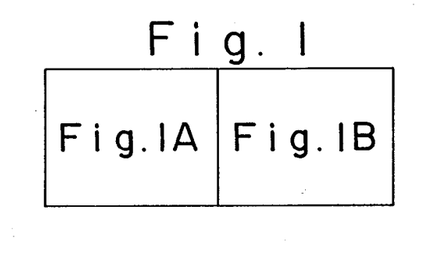
FIG. 1 is a schematic illustration showing the overall structure of a preprocessing circuit constructed in accordance with one embodiment of the present invention.
Figure 1A:
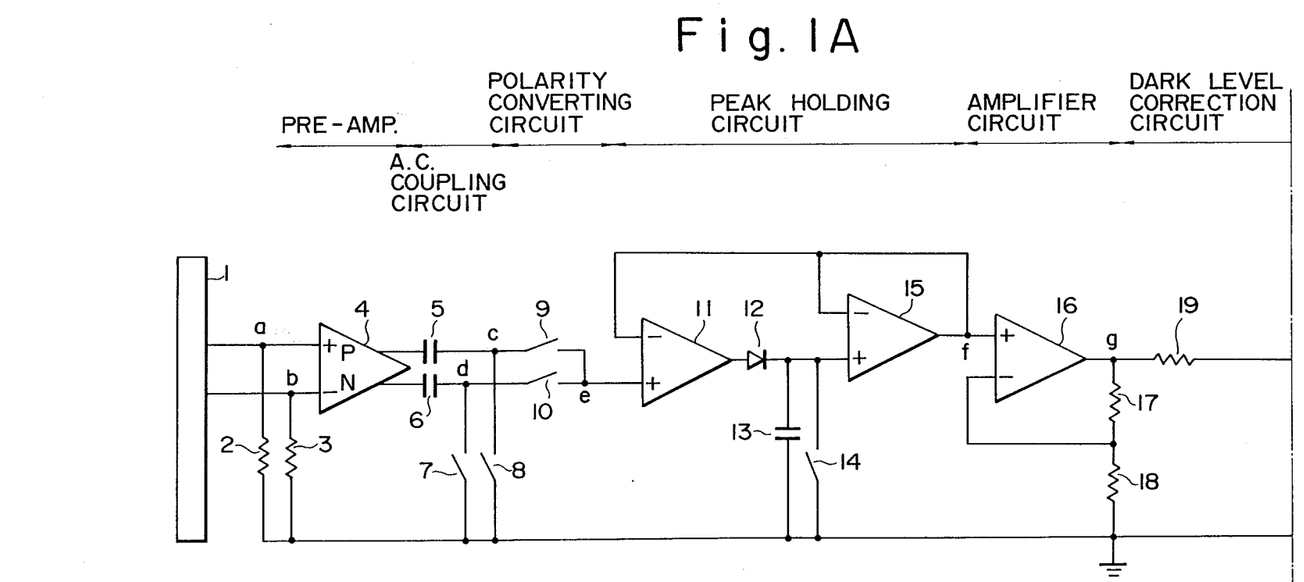
Figure 1B:
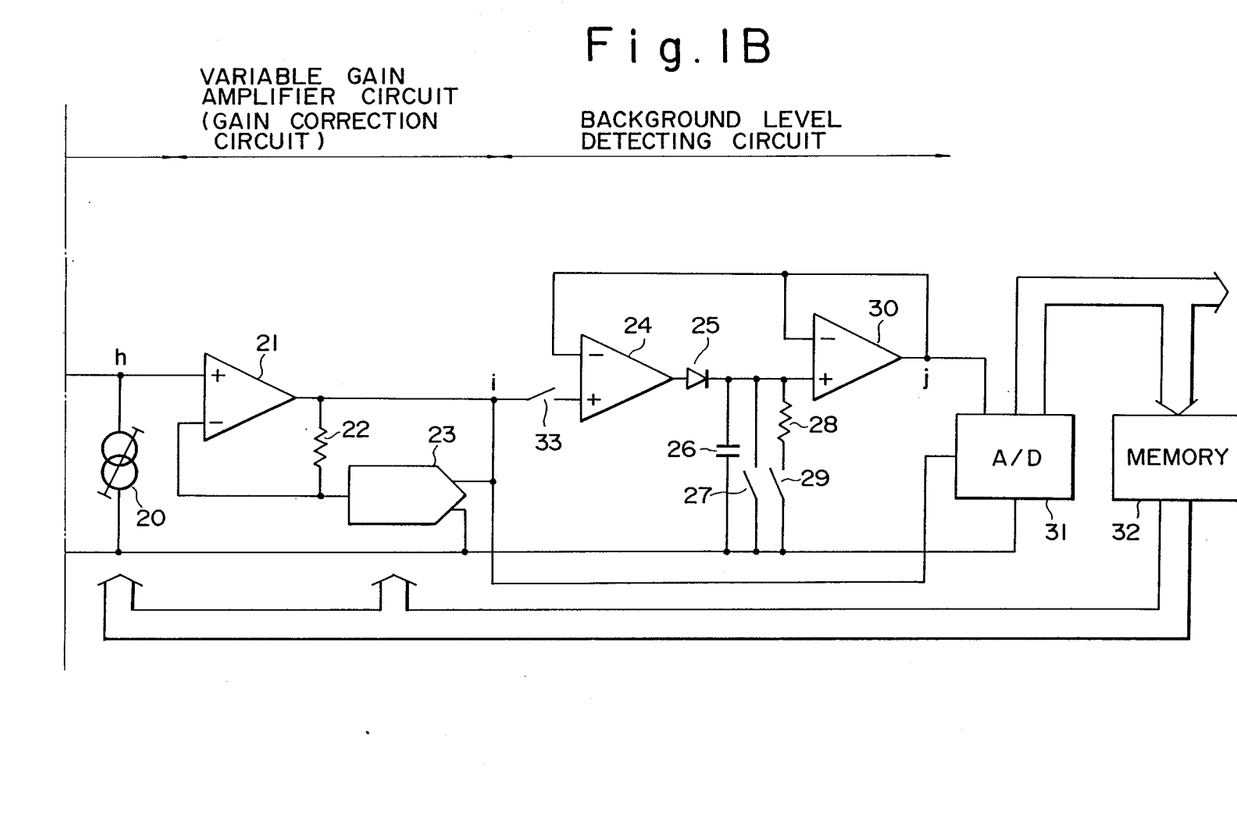

Referring now to FIG. 1, there is shown a preprocessing circuit constructed in accordance with one embodiment of the present invention and connected to a line sensor 1 which is typically comprised of a plurality of photoelectric elements arranged in the form of a single array. As will be made clear later, the photoelectric elements are divided or grouped into a plurality of groups or blocks, each preferably having a predetermined number of photoelectric elements. The preprocessing circuit includes a preamplifier 4 which is connected to the line sensor 1 such that a pair of read data obtained at the line sensor 1 at two substantially symmetrical locations with respect to the center of the line sensor 1 is supplied to the preamplifier 4. The preamplifier 4 is a differential input/differential output type preamplifier which has its non-inverting input terminal connected to receive one of the pair of output signals from the line sensor 1 and its inverting input terminal connected to receive the other output signal from the line sensor 1.

Each of the pair of non-inverting and inverting input terminals of the preamplifier 4 is connected to ground through an integration resistor 2 or 3. The preamplifier 4 supplies a differential output so that a pair of output signals opposite in polarity is output from the preamplifier 4. In order to obtain the pair of output signals as an a.c. output, there are provided coupling capacitors 5 and 6 and shunt switches 7 and 8 to remove any d.c. component.

A pair of switches 9 and 10 is provided, each connected to the corresponding one of the pair of output terminals of the preamplifier 4 through the corresponding one of the coupling capacitors 5 and 6, and these switches 9 and 10 define a polarity converting circuit. Since a pair of outputs from the line sensor 1 is input into the preamplifier 4 as a differential input, there are obtained output signals opposite in polarity at nodes c and d which are connected to the respective output terminals of the preamplifier 4 through the respective coupling capacitors 5 and 6. Thus, at nodes c and d, there are positive and negative signals. The nodes c and d are commonly connected to a node e through respective switches 9 and 10. In the present embodiment, the polarity converting switches 9 and 10 are suitably operated to be on and off so as to convert the positive and negative signals present at nodes 9 and 10 to be only positive at node e.

The node e is connected to the non-inverting input terminal of a comparator 11 which has its output terminal connected to the non-inverting input terminal of a buffer amplifier 15 through a rectifying diode 12. The buffer amplifier 15 has its output terminal connected to its inverting input terminal and also to the inverting input terminal of the comparator 11 to thereby define a feed-back loop. To the non-inverting input terminal of the buffer amplifier 15 is connected a holding capacitor 13 and a reset switch 14 in parallel, which define a peak holding circuit. Thus, a detection signal whose polarity has been set to be positive by the polarity converting switches 9 and 10 and which is obtained at node e is input into this peak holding circuit defined by the holding capacitor 13 and the reset switch 14.

The output of the buffer amplifier 15 (or the peak holding circuit) is connected to the non-inverting input terminal of an operational amplifier 16 which, together with gain setting resistors 17 and 18, defines a non-inverting amplifier circuit. The voltage gain of this amplifier circuit is determined by the following equation.

$$G = (R17 + R18)/R18.$$

It is to be noted that the voltage gain is preferably adjusted in accordance with the reading speed of the line sensor 1. That is, in order to set an S/N ratio which is sufficient relative to the noise in the circuit, it is necessary to provide a relatively large signal level. A signal at node g which is connected to the output terminal of the amplifier 16 contains a shading distortion.

A dark level correction resistor 19 has its one end connected to node g and the other end of the resistor 19 is connected to a node h to which a dark level correction constant current source 20 is connected. Thus, the resistor 19 and the current source 20 together define a dark level correction circuit, which will be described in detail later with reference to FIG. 8. Briefly stated, for example a 3-bit dark level correction data for each of the plurality of photoelectric elements of the line sensor 1 is stored in a memory 32 and dark level correction current is set in accordance with by the data stored in the memory 32. The dark level correction current thus set flows through a dark level correction resistor 19, whereby a voltage drop is produced between nodes g and h as a dark level correction voltage (offset correction voltage).

The node h is connected to the non-inverting input terminal of an operational amplifier 21 whose output terminal is connected to its inverting input terminal through a gain setting resistor 22 in the form of a feedback loop. The inverting input terminal of the operational amplifier 21 is also connected to an input terminal of a D/A converter 23. With this structure, a signal which has been subjected to dark level correction is input into the non-inverting input terminal of the operational amplifier 21, so that there is defined a variable gain amplifier circuit (gain correction circuit), which will be described further in detail later with reference to FIG. 9. Briefly stated, the gain of the variable gain amplifier circuit is set in accordance with the correction data for each of the photoelectric elements of the line sensor 1, which data is stored in the memory 32.

The output of the operational amplifier 21 is connected to a node i which is connected to the non-inverting input terminal of a comparator 24 through a sampling switch 33. Thus, a gain-corrected detection signal at node i is input into the comparator 24 of a background level detecting circuit through the sampling switch 33. The background level detecting circuit includes the comparator 24, a buffer amplifier 30, a rectifying diode 25, a holding capacitor 26, a reset switch 27, an integrating resistor 28 and an integrating switch 29 and it functions as a peak holding circuit to thereby hold the peak value of the background level.

Also shown in FIG. 1 is a parallel A/D converter 31 which converts a preprocessed analog signal into a digital signal using the background level as a reference voltage and supplies the digital signal as its output signal. Also provided in the structure shown in FIG. 1 is a memory 32 which stores a dark level correction data and a gain correction data for each of the photoelectric elements of the line sensor 1, and the memory 32 may be comprised of a RAM or EPROM.

Now, each section of the present preprocessing circuit having the above-described overall structure will be described in detail below.

Figure 6:
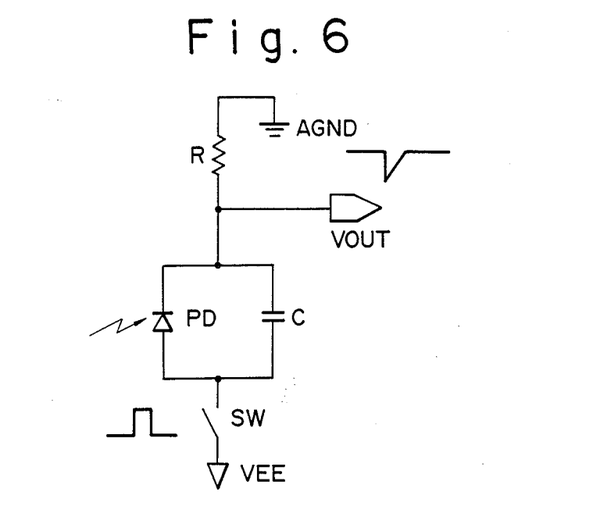
FIG. 6 is a circuit diagram showing the structure of one of a plurality of photoelectric elements which define a line sensor in accordance with one embodiment of the present invention.

Referring first to FIG. 6, there is shown the structure of one photoelectric element or light-receiving element of the line sensor 1, which includes a photodiode PD. As shown, a capacitor C is connected in parallel with the photodiode PD, and the parallel connection of the photodiode PD and the capacitor C has one end connected to a low voltage source VEE through a switch SW. The other ed of this parallel connection is connected to ground AGND through a resistor R, and the upper connecting point between the photodiode PD and the resistor R is connected to an output terminal VOUT.

With this structure, the switch SW is first closed to charge the capacitor C. Then, the switch SW is set open so that the resistance of the photodiode PD is reduced depending on the amount of light impinging thereon. As a result, the charge stored in the capacitor C moves and thus the potential at the plate of the capacitor C connected to the switch SW goes up from VEE. When the switch SW is closed after a predetermined read cycle, the amount of current required for recharging the capacitor C flows, and a corresponding signal is produced at the terminal VOUT.

Figure 7:
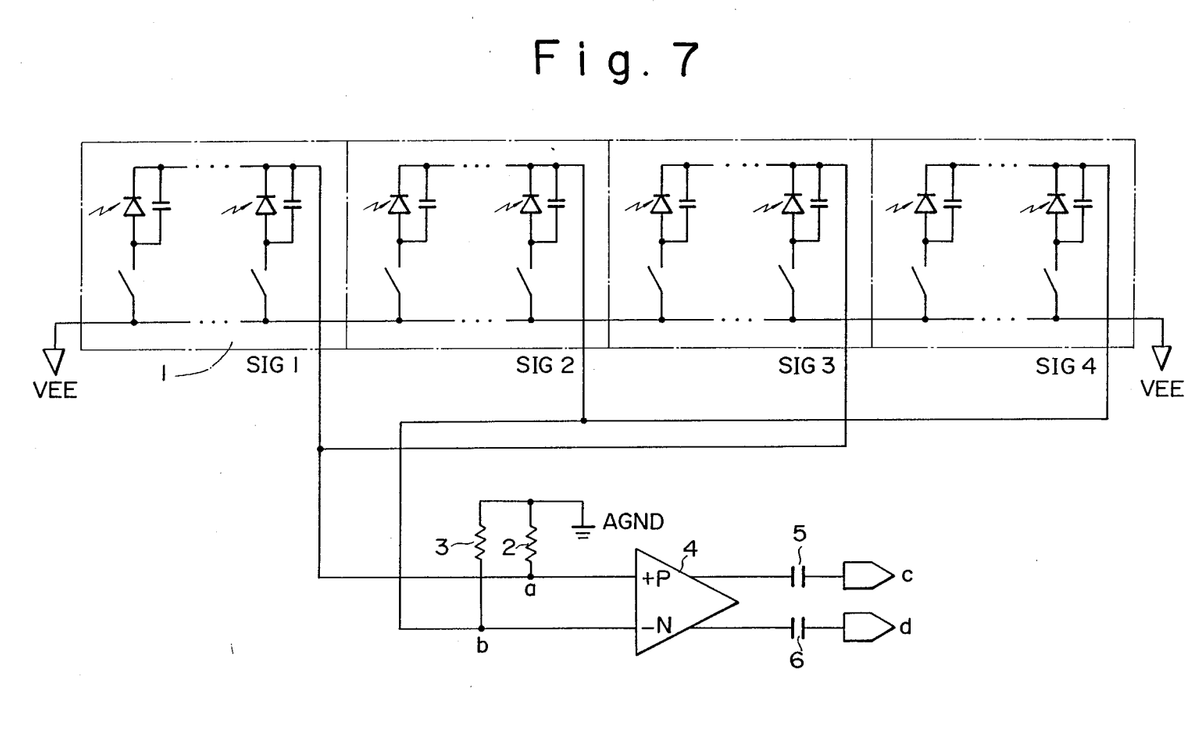
FIG. 7 is a schematic illustration showing grouping of a plurality of photoelectric elements of a line sensor and a connection between the line sensor and the preamplifier of a preprocessing circuit in accordance with one embodiment of the present invention.

FIG. 7 illustrates the internal structure of the line sensor 1 including a plurality of photoelectric elements, each having the structure as described above and shown in FIG. 6, arranged in the form of a single array at a predetermined pitch. In the illustrated embodiment, the photoelectric elements are divided or grouped into four groups or blocks SIG1 through SIG4. Typically, each of the blocks has a predetermined number of photoelectric elements. For example, each of blocks SIG1 through SIG4 has 432 bits (i.e., 1728/4) for A4 size and 512 bits (i.e., 2048/4) for B4 size.

As a substrate of the line sensor 1, on which the plurality of photoelectric elements are formed, becomes longer and thus the interconnection pattern on the substrate becomes longer, effects due to voltage source noises and periodic noises from the clock line become larger. In the preferred embodiment of the present invention, when mounting the present preprocessing circuit, a signal processing LSI (preamplifier 4) is located substantially at the center of the substrate with an interconnection pattern, such as analog ground, being arranged symmetrically with the signal processing LSI at the center. With this arrangement, effects on a sensor output by noises are balanced between blocks SIG1 and SIG4 and also between blocks SIG2 and SIG3. Therefore, as a differential input to the differential input/differential output type preamplifier 4, the photoelectric elements of blocks SIG1 and SIG3 are operatively coupled to one input terminal (non-inverting input terminal in the illustrated embodiment) of the preamplifier 4 and the photoelectric elements of blocks SIG2 and SIG4 are operatively coupled to the other input terminal (inverting input terminal in the illustrated embodiment) of the preamplifier 4.

Using an amplifier having an excellent CMRR (Common Mode Rejection Ratio) as the preamplifier 4, a noise component superimposed on a differential input is reduced to a level which can be neglected as compared with a signal component in an output signal, so that only the signal component is amplified. This leads to an enhancement of S/N ratio. For example, if use is made of $\mu$A733 equivalent as the preamplifier 4, when the gain of the preamplifier 4 while reading white level is approximately 200 times, then the S/N ratio is approximately equal to 30 dB.

Figure 8:
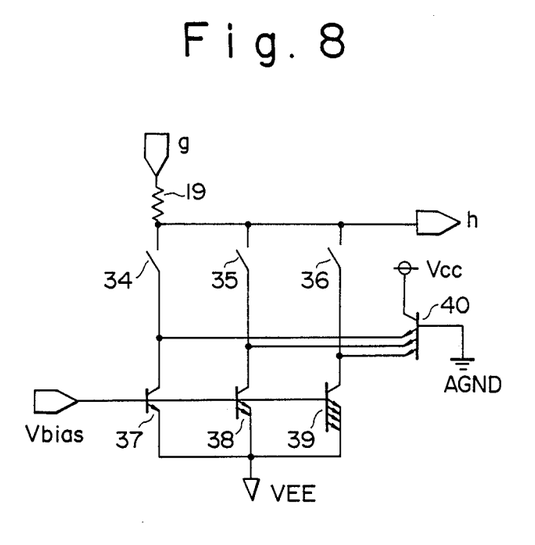
FIG. 8 is a circuit diagram showing the structure of a dark level correcting circuit suitable for use in the present preprocessing circuit.

FIG. 8 illustrates a specific example of the dark level correction circuit suitable for use in he preprocessing circuit of FIG. 1. The illustrated dark level correcting constant current source 20 shown in FIG. 1 includes NPN transistors 37 through 40 and switches 34 through 36. The base of each of the NPN transistors 37 through 39 is connected to receive a bias voltage Vbias and the NPN transistors 37 through 39 are structured to produce constant current Ibias, 2 Ibias and 4 Ibias, respectively, in accordance with their respective weighted emitter sizes. NPN transistor 40 is provided so as to prevent the NPN transistors 37 through 39 from being saturated.

With this structure, when the switches 34 through 36 are selected by a 3-bit dark level correction data, superimposed current (dark level correction current Idlc) is set at a terminal h. And, the dark level correction current Idlc flows through the dark level correction resistor 19 so that there is produced a voltage drop between terminals h and g. The voltage drop may be expressed by Idlc·R19. Thus, there is obtained a dark level correction voltage (offset correction voltage).

In order to operate the switches 34 through 36, a dark level correction data ND is represented by 3-bit dark level correction data DT0, DT1 and DT2, which are stored in the memory 32, as follows:

$$ND = 2^2 \times DT2 + 2^1 \times DT1 + 2^0 \times DT0.$$

ND is an integer between "0" and "7." Thus, the dark level correction current Vdlc may be expressed as follows.

$$\begin{aligned} Vdlc &= -Idlc \times R19 \\ &= -Ibias \times (2^2 \times DT2 + 2^1 \times DT1 + 2^0 \times DT0) \times R19 \end{aligned}$$

Figure 9:
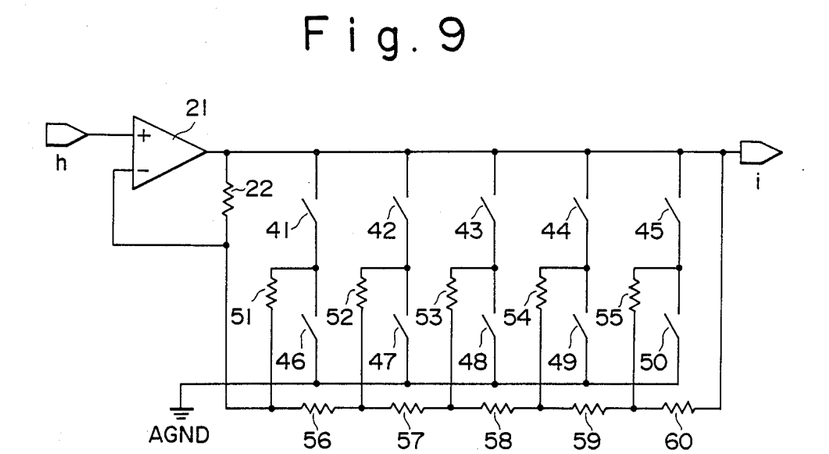
FIG. 9 is a circuit diagram showing the structure of a variable gain amplifier circuit suitable for use in the present preprocessing circuit.

FIG. 9 illustrates the detailed structure of a variable gain amplifier suitable for use in the present preprocessing circuit shown in FIG. 1. The D/A converter 23 provided in the preprocessing circuit of FIG. 1 is a R-2R type D/A converter comprised of resistors 51 through 60 and switches 41 through 50 as shown in FIG. 9 and a dividing circuit is defined by operational amplifier 21, resistor 22 and the D/A converter. In order to operate the switches 41 through 45 (46 through 50), a gain correction data NG is represented by 5-bit gain correction data DS0, DS1, DS2, DS3 and DS4 stored in the memory 32 as in the following manner.

$$NG = 2^4 \times DS4 + 2^3 \times DS3 + 2^2 \times DS2 + 2^1 \times DS1 + 2^0 \times DS0$$

Here, NG is an integer between "0" and "31."

As a result, a correction gain AG may be expressed as follows.

$$\begin{aligned} AG &= 64/(33 + NG) \\ &= 64/(33 + 2^4 \times DS4 + 2^3 \times DS3 + 2^2 \times DS2 + 2^1 \times DS1 + 2^0 \times DS0) \end{aligned}$$

In the preferred embodiment, the present preprocessing circuit is constructed in the form of LSI.

Now, returning to FIG. 1, the operation of the present preprocessing circuit will be described below.

Figure 10:
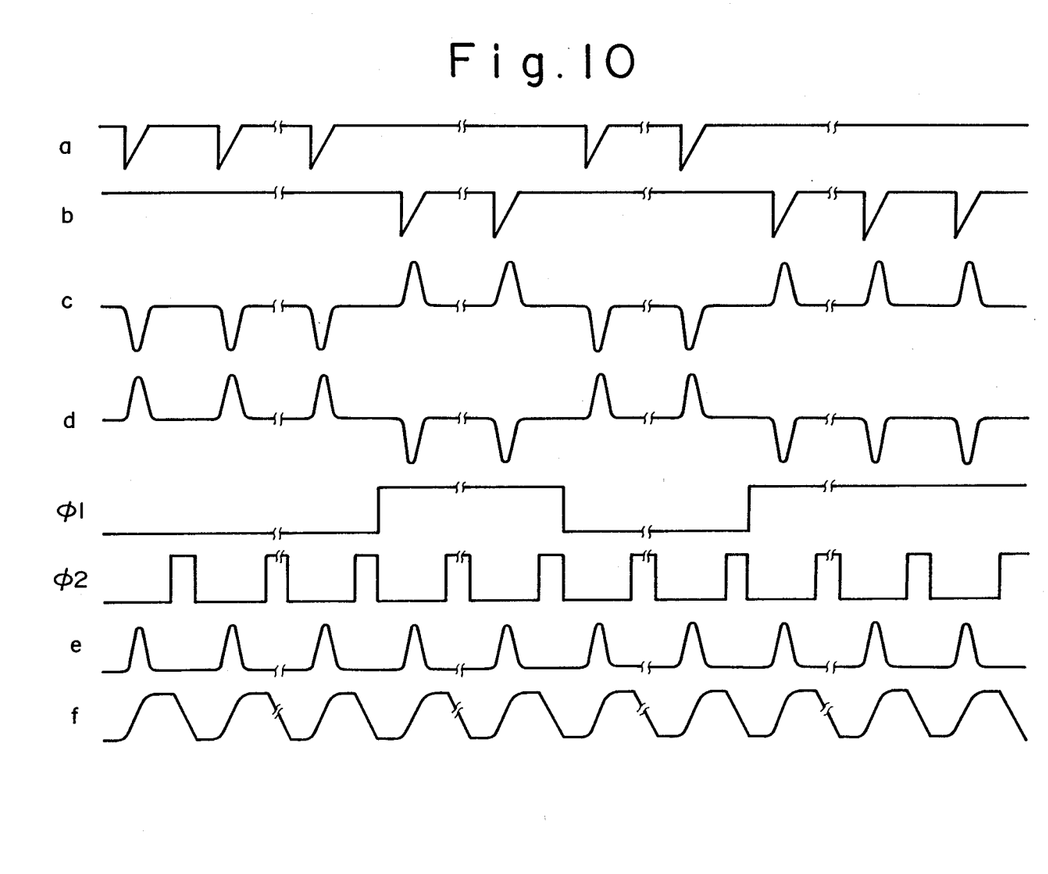
FIG. 10 is a waveform diagram which is useful for understanding the operation of the structure shown in FIG. 1.

A pair of read outputs from a pair of photoelectric elements of the line sensor 1 which are located substantially symmetrically with respect to the center of the line sensor 1 is supplied to nodes a and b. The waveform of each of these signals at nodes a and b is illustrated in FIG. 10. These signals at nodes a and b are supplied as a differential input to the preamplifier 4. A differential output from the preamplifier 4 is supplied to nodes c and d through an a.c. coupling circuit comprised of a pair of capacitors 5 and 6. The waveform of each of the signals at nodes c and d is also shown in FIG. 10. At this stage, each of the signals at nodes c and d have both positive and negative bits or components. As shown in FIG. 10, the positive bit of the signal at one of nodes c and d corresponds to the negative bit of the signal at the other of the nodes c and d and thus the positive and negative components of these signals at nodes c and d are symmetrical. Thus, by determining the correspondence between each bit of the signal and one of the plurality of photoelectric elements of the line sensor 1 by decoding in advance by an address counter or sequence counter which electronically scans the line sensor 1, if the polarity converting switches 9 and 10 are operated with a timing of a polarity converting signal indicated by $\phi 1$ in FIG. 10 and a signal of its opposite polarity to thereby select either one of the positive or negative polarity components of the outputs from the preamplifier 4, there is obtained a signal having only positive components at node e as shown in FIG. 10.

The switch 14 of the peak holding circuit is operated by a timing of a signal $\phi 2$ shown in FIG. 10. The switch 14 is turned on prior to inputting of a sensor output signal to thereby cause the holding capacitor 13 to be reset. And, the switch 14 is turned off slightly before the sensor output signal is input. When the sensor output signal (a differential waveform e in the positive side shown in FIG. 10) is input to the non-inverting input terminal of the comparator 11, an output signal of the comparator 11 becomes high in level and flows into the holding capacitor 13 through the rectifying diode 12 to thereby cause the holding capacitor 13 charged. The voltage of the thus charged holding capacitor 13 is input into the non-inverting input terminal of the buffer amplifier 15 and thus its voltage appears at node f connected to the output terminal of the buffer amplifier 15. The voltage at node f is also fed back to the inverting input terminal of the comparator 11 and it follows up to the peak value of the input signal at node e. As soon as it has reached a level which slightly exceeds the peak value, the comparator 11 outputs a low level. And thus the voltage level of the peak value charged at the holding capacitor 13 remains to be held until the switch 14 is turned on to reset the capacitor 13, so that the signal f shown in FIG. 10 is output to node f.

Incidentally, if use is made of a low-speed amplifier, the comparator 11 and the buffer amplifier 15 tends to overshoot, and thus it is preferable to use a high-speed amplifier.

Figure 11:
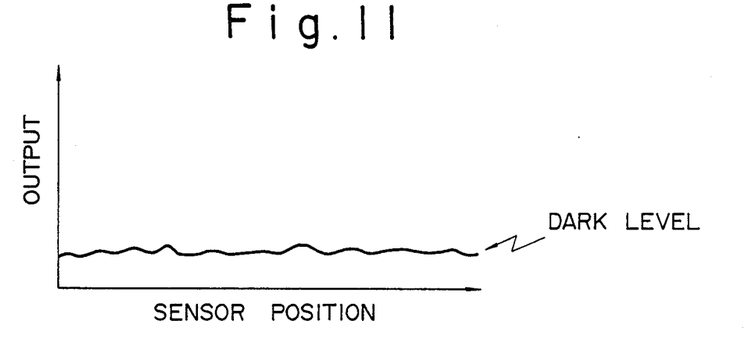
FIG. 11 is a waveform diagram showing a dark level signal at terminal g.
Figure 12:
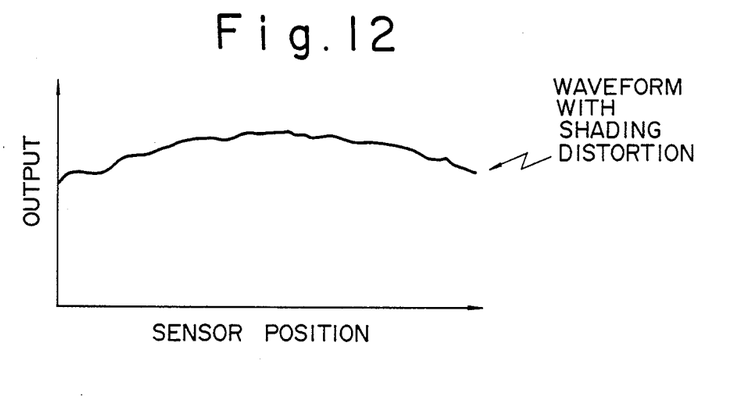
FIG. 12 is a waveform diagram showing a signal containing a shading distortion at terminal g.

At the output node g of the amplifier circuit including the operational amplifier 16, there is obtained a dark level waveform as shown in FIG. 11 when dark current is measured without irradiation; whereas, there is obtained a waveform having shading as shown in FIG. 12 when measurement is carried out with irradiation.

In accordance with the present embodiment, dark current correction data and gain correction data for each of the plurality of photoelectric elements of the line sensor 1 are stored in the memory 32 in advance. These dark level correction data and gain correction data are formed as in the following manner. With dark level correction data DT2 through DT0 set at "1", the voltage between nodes g and h is measured for one photoelectric element and its measured value is set as a full-scale value of the dark level correction. Then, this full-scale value is supplied as a reference voltage of the A/D converter 31. And then with dark level correction data DT2 through DT0 set at "0" and gain correction data DS4 through DS0 set at "1", the dark level of its photoelectric element is subjected to A/D conversion, whereby the upper three bits of data of the A/D converter 31 stored into the memory 32 as dark level correction data DT2, DT1 and DT0 of the photoelectric element in question. This process is repeated for all of the remaining photoelectric elements of the line sensor 1 to thereby obtain and store dark level correction data DT2 through DT0 in the memory 32.

In order to obtain gain correction data, dark level correction data DT2 through DT0 are set at "0" and gain correction data DS4 through DS0 are set at "1." Then, a voltage of white level is input as a reference voltage of the A/D converter 31. In the present embodiment, the data of the A/D converter 31 is a 6-bit data. Then, for one photoelectric element, its white level is subjected to A/D conversion to thereby confirm that the most significant bit of the A/D converter 31 is "1" (because the gain of the variable gain amplifier is 1 or approximately 2). The lower five bits of data are stored into the memory 31 as gain correction data DS4, DS3, DS2, DS1 and DS0 of the photoelectric element in question. This process is repeated for the rest of the photoelectric elements of the line sensor 1 to produce and store gain correction data DS4 through DS0 in the memory 32.

Figure 13:
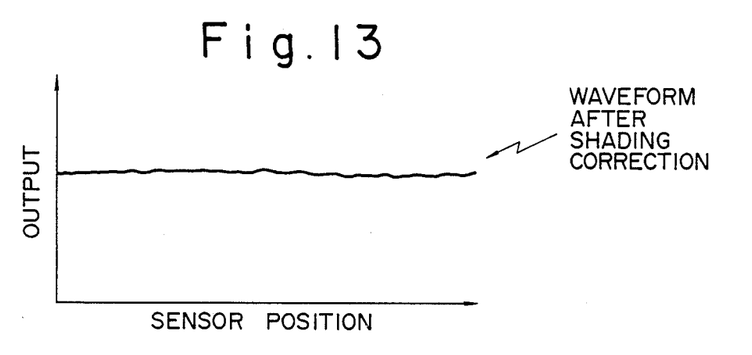
FIG. 13 is a waveform diagram showing a signal after the application of a shading correction.

If a dark level and a gain are corrected in accordance with the dark level correction data and the gain correction data, respectively, which are stored in the memory 32 in a manner described above, there is obtained a shading-corrected signal waveform as shown in FIG. 13.

The operation of the background level detecting circuit is as follows. The switch 27 in FIG. 1 is turned on to have the holding capacitor 26 reset, and then the switches 27 and 29 are turned off. Then, at a location of an original where its background level is to be detected, the switch 33 is turned on to thereby hold the peak value of the background level in the peak holding circuit. In this case, the leading margin of an original or a white level section of a roller is detected. However, the leading margin of an original is not always at white level, so that, in such case, it is necessary to positively input white level into the holding capacitor 26 exteriorly. In the case where the background level differs on the same original, e.g., a laminated original, it is preferable to hold the up-to-date peak voltage level while allowing discharge to take place through the resistor 28 and the switch 29 with the switch 29 turned on.

As described above, in accordance with the present invention, an output of the background level detecting circuit is used as a reference voltage of the parallel A/D converter 31. And, dark level correction data and gain correction data for each of the plurality of photoelectric elements of the line sensor 1 are stored into the memory 32 at the time of shipping the present preprocessing circuit. Thus, when it is actually used for reading an original, a shading correction for using a plurality of tone levels between black and white levels can be carried out. For example, levels between black and white levels may be treated at 16 different levels, i.e., 4-bit accuracy (±3% accuracy). In accordance with the present invention, the plurality of photoelectric elements of the line sensor 1 are divided into a plurality of groups or blocks and a pair of outputs from a pair of blocks located approximately symmetrically with respect to the center of the line sensor is input into the present preprocessing circuit as a differential input, so that the common mode noise can be eliminated and an enhanced S/N ratio can be obtained.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A preprocessing circuit of a line sensor comprised of a plurality of photoelectric elements arranged in the form of a single array, comprising:

receiving means for receiving a pair of read output signals from a pair of said plurality of photoelectric elements which are located substantially symmetrically with respect to the center of said line sensor; and analog-to-digital converting means for converting an output signal from said receiving means into a digital output signal.

2. The circuit of claim 1 wherein said receiving means includes a preamplifier having a pair of input terminals for receiving said pair of read output signals from a pair of said plurality of photoelectric elements in the form of a differential input signal and having a pair of output terminals for outputting a pair of outputs as a differential output.

3. The circuit of claim 2 wherein said plurality of photoelectric elements are divided into a plurality of blocks and one of the input terminals of said preamplifier is operatively coupled to a first set of blocks and the other input terminal is operatively coupled to a second set of blocks, whereby each of said first set of blocks and a corresponding one of said second set of blocks are located substantially symmetrically with respect to the center of the line sensor.

4. The circuit of claim 2 further comprising:

selecting means for selecting one of said pair of outputs from said preamplifier to thereby provide an output signal of one predetermined polarity;

shading correcting means for correcting shading of said output signal before being supplied to said analog-to-digital converting means.

5. The circuit of claim 4 wherein said shading correcting means includes:

peak holding means for holding a peak value of said output signal of one predetermined polarity;

a memory for storing a dark level correction data for each of said plurality of photoelectric elements; and dark level correcting means for correcting a dark level of said peak value held by said peak holding means in accordance with the dark level correction data stored in said memory.

6. The circuit of claim 5 wherein said memory further stores a gain correction data for each of said plurality of photoelectric elements and said shading correcting means further includes variable gain amplifying means for correcting a gain of said output signal of one polarity in accordance with said gain correction data stored in said memory.

7. The circuit of claim 6 wherein said shading means further includes a background level detecting means for detecting and holding a peak value when detecting a background of an original.

* * * * *